Feb. 20, 1968   R. W. ERICKSON   3,369,696
CONTAINER CARRIER
Filed Dec. 13, 1965   6 Sheets-Sheet 1
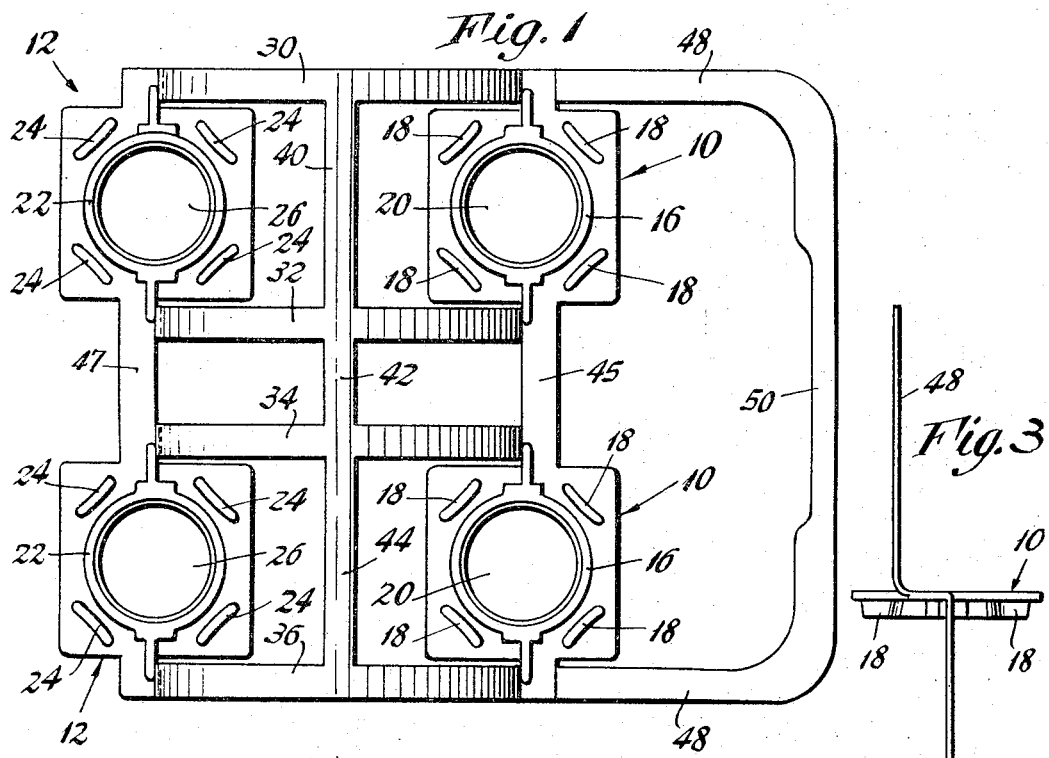
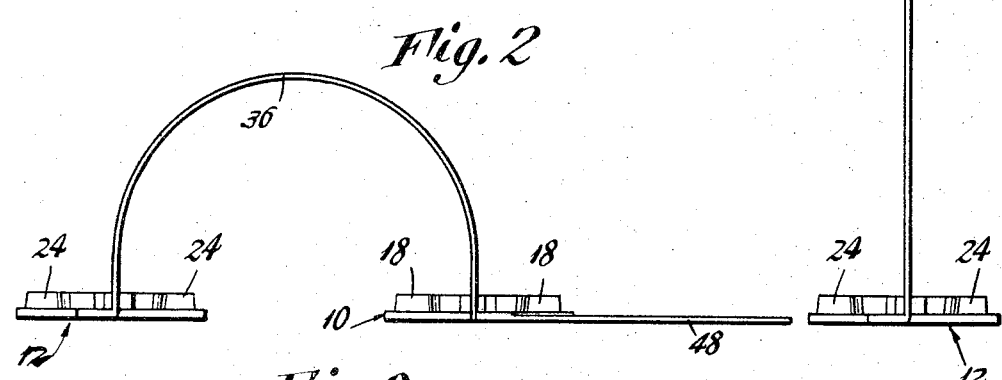
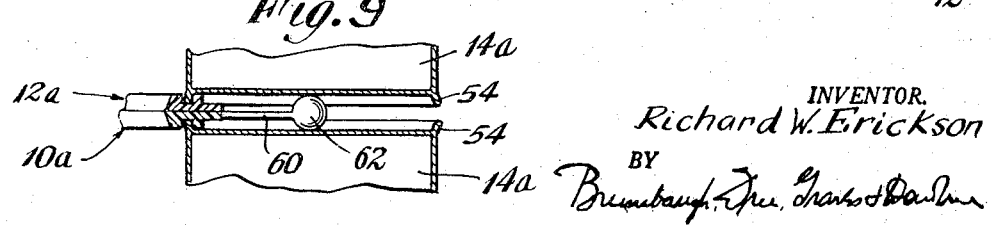
INVENTOR.
Richard W. Erickson
BY
ATTORNEY

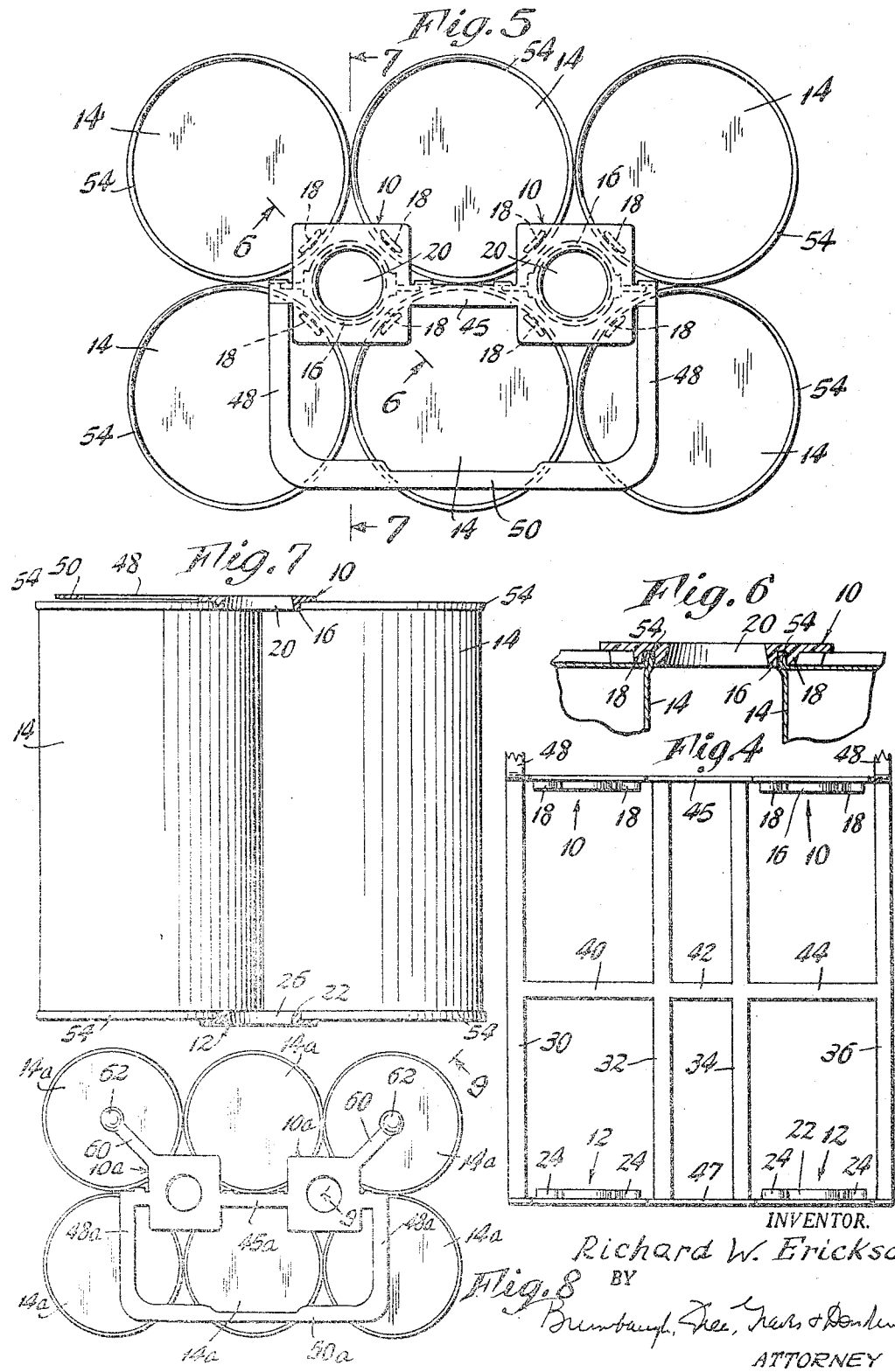

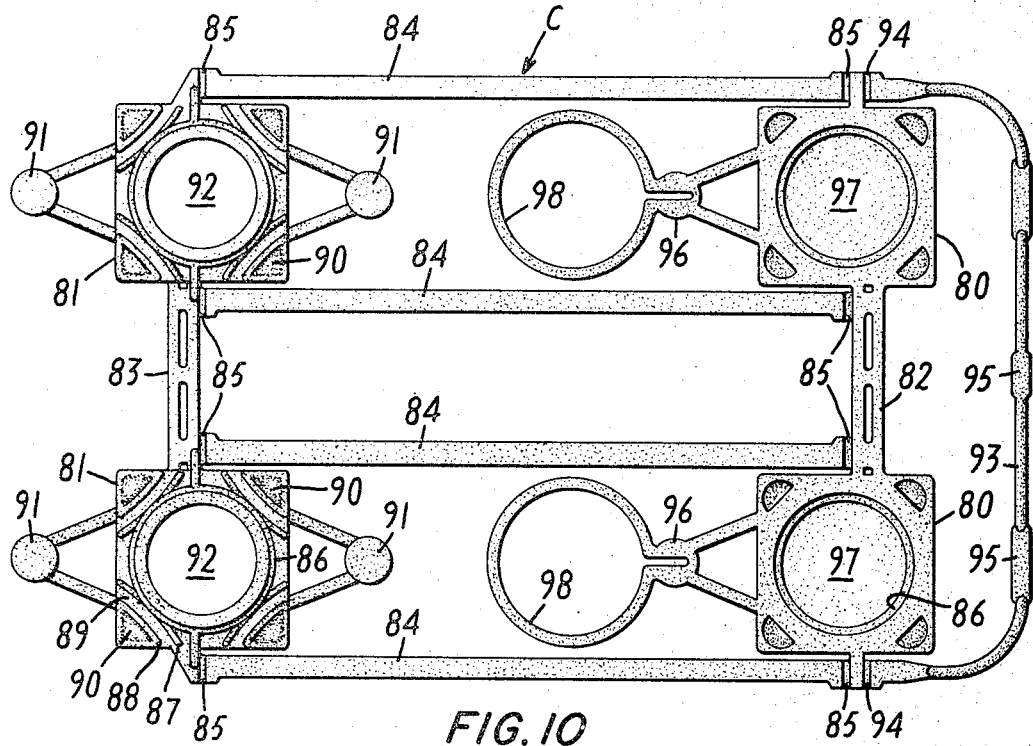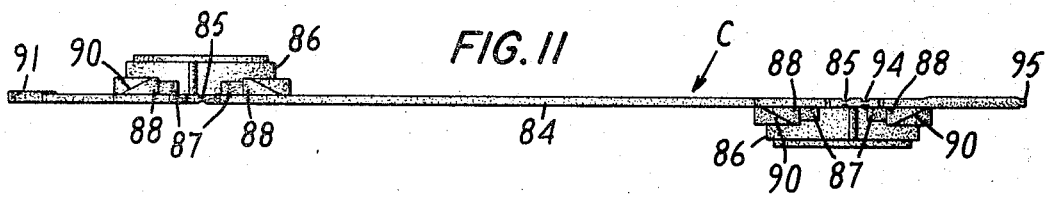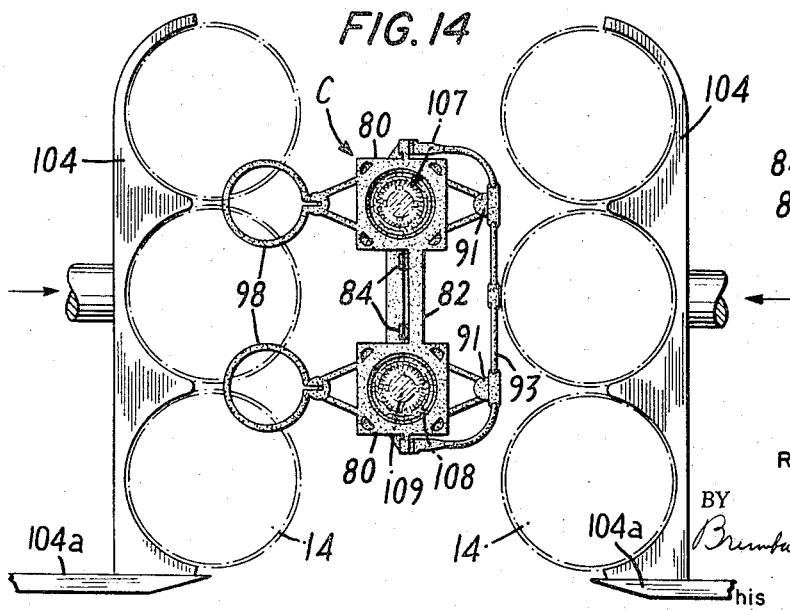

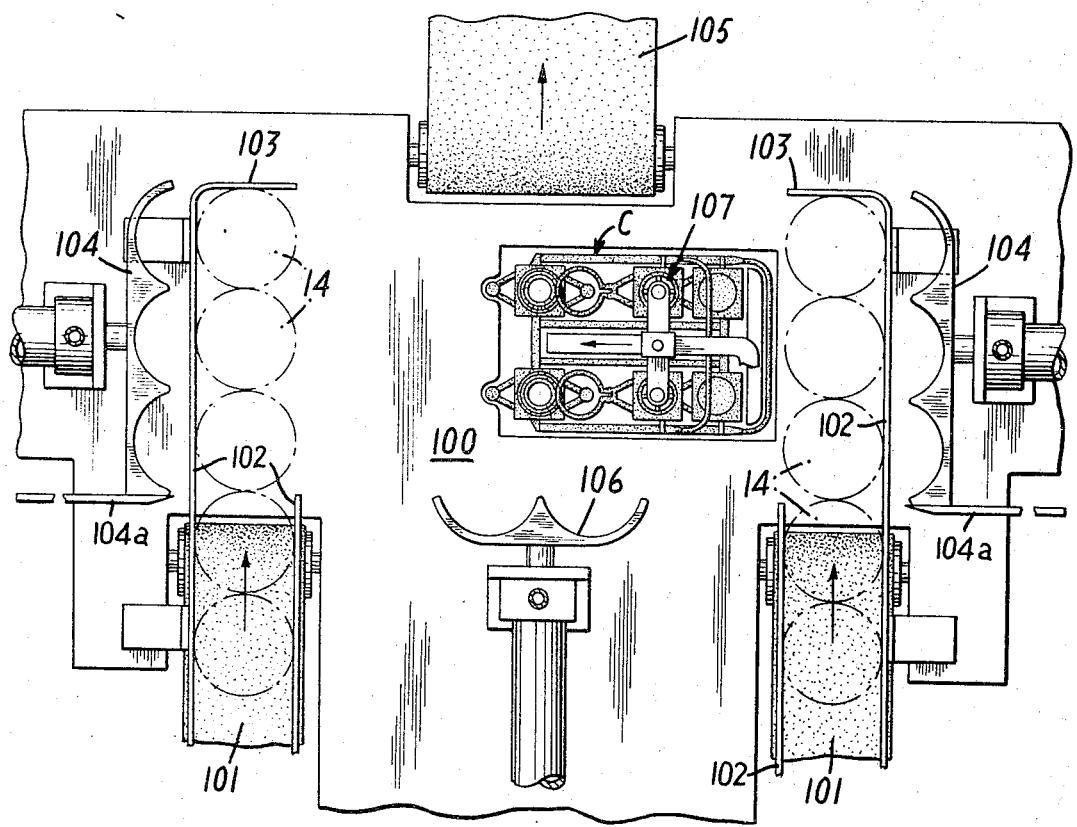
FIG. 13
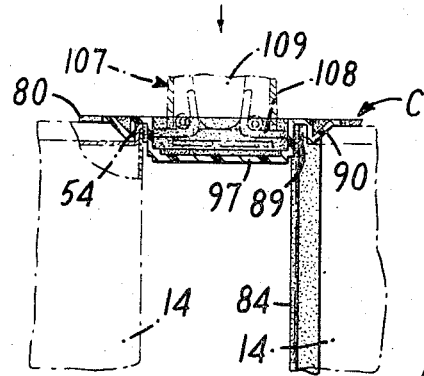
FIG. 18
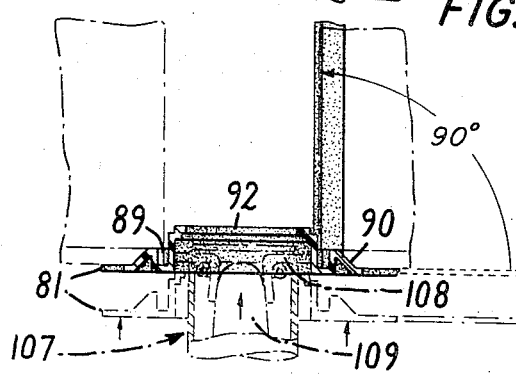

Feb. 20, 1968  R. W. ERICKSON  3,369,696
CONTAINER CARRIER

Filed Dec. 13, 1965  6 Sheets-Sheet 5

INVENTOR.
RICHARD W. ERICKSON
BY
*Brumbaugh, Free, Graves & Donohue*
his ATTORNEYS Feb. 20, 1968    R. W. ERICKSON    3,369,696
CONTAINER CARRIER
Filed Dec. 13, 1965    6 Sheets-Sheet 6
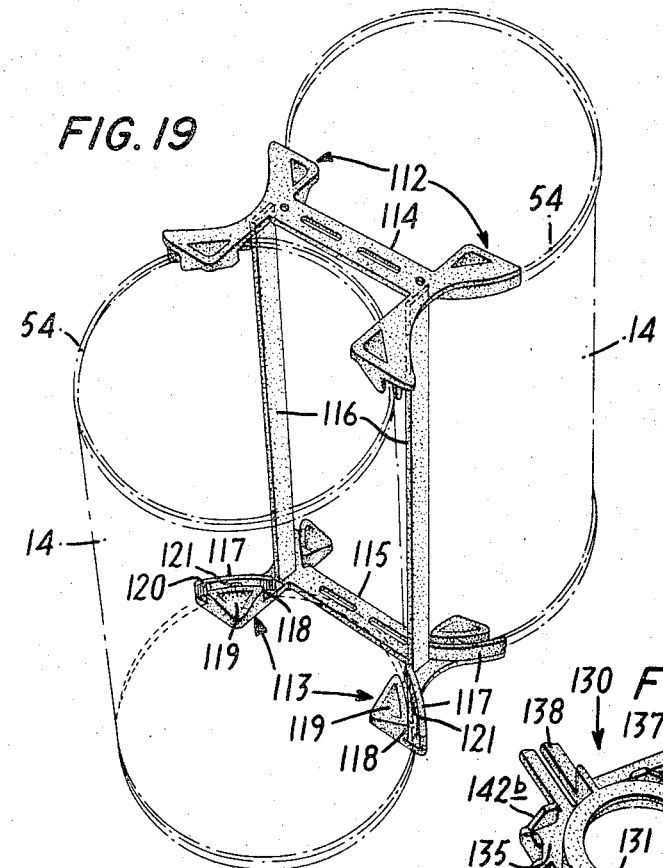
FIG. 19
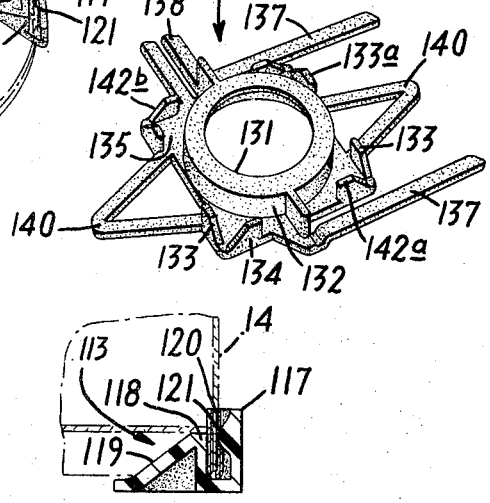
FIG. 22
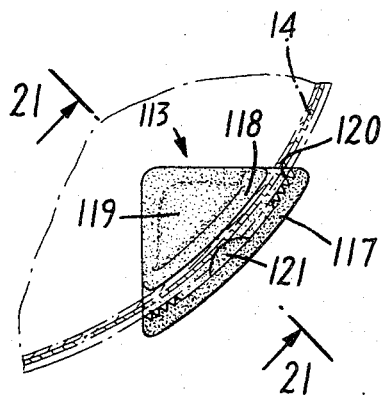
FIG. 20
FIG. 21
INVENTOR.
RICHARD W. ERICKSON
BY
his    ATTORNEYS _United States Patent Office_ 3,369,696
Patented Feb. 20, 1968

3,369,696
CONTAINER CARRIER
Richard W. Erickson, Coral Gables, Fla., assignor to International Omni-Pak Corporation, New York, N.Y., a corporation of New York
Continuation-in-part of application Ser. No. 139,262, Sept. 19, 1961. This application Dec. 13, 1965, Ser. No. 513,189
5 Claims. (Cl. 220—102)

ABSTRACT OF THE DISCLOSURE

The specification discloses different embodiments of a one-piece container carrier of a type which holds containers in nested interlocking relationship and includes upper and lower channeled elements engageable with the chimes at opposite ends of the containers and means integrally formed with both channeled elements and connecting them together to hold them in interlocking relationship with the chimes at opposite ends of the containers. The specification also discloses a method and apparatus for packaging containers in a container carrier of this type.

In one embodiment of the container carrier one of the channeled elements has an upstanding cap formed at the center, the outer wall thereof defining at least part of a channel for holding a chimed container and the inner wall serving as a bottle engaging wall so that the channeled element can be detached from the carrier and used as a bottle cap after it has served its purpose as a container carrier.

In another embodiment of the container carrier the container carrier includes means formed within the channels of the channeled elements to prevent relative movement of the chimes within the channeled elements. In one form of the invention serrations are formed on at least one of the channel defining walls to prevent movement of the chime within the respective channel. In another embodiment a protuberance is formed on one of the channel defining walls to interlock with the chimed portion of the container.

---

This invention relates to a novel container carrier for carrying in nested relationship a plurality of containers having chimes at both ends and to a method and apparatus for packaging the containers in the container carrier.

The application is a continuation-in-part of my copending application Ser. No. 139,262, filed Sept. 19, 1961.

The novel container carrier of the present invention includes a pair of connected channeled elements which engage opposite ends of the containers and interlock with the chimes thereof to hold a cluster of two or more containers in side-by-side tangential nested relationship. The novel container carrier of the present invention does not require cardboard or other wrapping material around the containers and leaves the walls of the containers exposed to view. The container carrier of the present invention is ideally suited for fabrication by molding from high strength, durable, flexible and inexpensive plastic materials so that the container carrier can be disposed of when the containers are removed therefrom.

All of the containers are readily packed simultaneously in the container carrier by a novel method and apparatus which also forms part of the present invention.

For a more complete understanding of the present invention, reference can be made to the detailed description which follows and to the accompanying drawings in which:

FIGURE 1 is a top plan of one embodiment of the container carrier of the present invention;

FIGURE 2 is a side elevational view of the container carrier shown in FIGURE 1;

FIGURE 3 is an end elevational view of the container carrier after it has been straightened or set up in readiness for receiving the cans or containers;

FIGURE 4 is a fragmentary front (or rear) elevational view of the set-up carrier of FIGURE 3, a portion of the handle being omitted for purposes of illustration;

FIGURE 5 is a top plan view of the set-up carrier having assembled to it six containers or cans;

FIGURE 6 is a fragmentary vertical sectional view, taken on the line 6—6 of FIGURE 5;

FIGURE 7 is a vertical sectional view, taken on the line 7—7 of FIGURE 5;

FIGURE 8 is a top plan view of a modified form of the carrier wherein spacer means are provided for engagement with end portions of the cans or containers;

FIGURE 9 is a fragmentary vertical sectional view taken on the line 9—9 of FIGURE 8, showing also in similar section a lower portion of another pack resting on top of the pack of FIGURE 8;

FIGURE 10 is a plan view of still another embodiment out of the container carrier of the present invention;

FIGURE 11 is an end view of the container carrier shown in FIGURE 10;

FIGURE 12 is an enlarged fragmentary view of part of FIGURE 11;

FIGURE 13 is a plan view illustrating apparatus for assembling containers in the novel container carrier of the present invention;

FIGURE 14 is a plan view illustrating the container carrier set up for receiving the containers to be carried thereby;

FIGURE 18 is a view similar to FIGURE 17 taken along the line 18—18 of FIGURE 15 showing the chimes of the containers locked in the channeled elements;

FIGURE 19 is a perspective view of still another embodiment of the container carrier in which two containers are carried in side-by-side relation;

FIGURE 20 is an enlarged fragmentary view of one of the channeled elements of the container carrier shown in FIGURE 19;

FIGURE 21 is a cross-sectional view taken along the line 21—21 of FIGURE 20; and FIGURE 22 is an enlarged perspective view of another embodiment of channeled element adapted to receive the chimes of a container.

Figure 15:
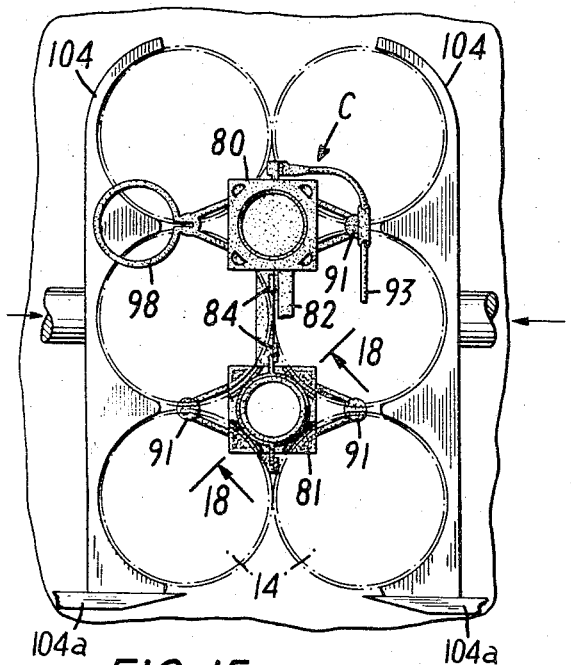
FIGURE 15 is a view similar to FIGURE 14 showing the containers assembled in the container carrier with the chimes of the containers locked within the respective channeled elements.

Referring first to FIGURES 1 to 7, the container carrier or pack of the present invention is illustrated as comprising a single molded three-dimensional plastic piece C which may be fabricated by a single molding operation. The plastic piece constituting the pack structure comprises a plurality of upper and lower channeled members 10 and 12, respectively, the said channeled members having channel-defining means which are interlockingly engageable with the tops and bottoms, respectively, of a plurality of containers, illustrated herein as circular cans 14. As seen in FIGURE 5, the containers 14 are placed side-by-side in closely spaced relation, there being six in number constituting a standard pack quantity. The channel defining formations on the channeled elements 10 are identical and include an inner ring-shaped upstanding formation 16 and four outer curved lugs or walls 18 spaced apart from the outer wall or the ring-shaped formation at each of the corners of the channeled element 10. The channel defining formations on the channeled elements 12 are identical and include an inner ring-shaped upstanding formation 22 and four outer curved lugs or walls 24 spaced apart from the outer wall of the ring-shaped formation at each of the corners of the channeled element 12. There are large centrally located apertures or openings 20 formed in bases of the upper channeled elements 10 and similar apertures or openings 26 formed in the bases of the lower channeled elements 12. The ring-shaped formations 16 and 22 reinforce and impart rigidity to the channeled elements 12 and 22. In addition, the inner walls of these ring-shaped formations provide gripping surfaces for handling and setting up the container carrier, as will be described below, and the openings 20 and 26 afford access to these inner walls, as well as finger gripping openings to facilitate carrying the package. Gripping elements 107 described below engage these gripping surfaces to hold the lower channeled elements 12 in position and lift the upper channeled elements 10 and orient them 180° to their overhead positions shown in FIGURE 3.

The plastic molded piece is preferably of linear polyethylene or similar plastic composition characterized by flexibility and resilience, as well as appreciable strength or toughness and resistance to tearing or rupture. Accordingly, each of the corners of channeled members 10 and 12 will readily yield to permit the chimes 54 of the containers 14 to be forced into the chime-receiving channels thereof.

The upper and lower channeled members 10, 12 are joined by tie means comprising a plurality of thin, flexible bands or strips 30, 32, 34 and 36. As clearly seen in FIGURE 1, the strip 30, 32 straddle or extend between opposite portions of upper and lower channeled members 10, 12, whereas the webs 34, 36 straddle the remaining set or pair of channeled members 10, 12. The strips 32, 34 are arranged in spaced, parallel relation, and tie strips 40, 42 and 44 interconnect the flexible webs 30, 32, 34 and 36 as illustrated in FIGURE 1, the said tie strips being in alignment with each other. In the embodiment illustrated in FIGURE 2, the tie means comprising the connector strips 30, 32, 34 and 36 are molded in the shape of a half loop, whereas the upper and lower channeled members 10, 12 are molded substantially in the same plane. The extremities of the strips 30, 32, 34 and 36 are shown as connecting with the channeled members 10, 12 at substantially right angles. Tie strips 45 and 47 connect, respectively, the upper channeled members 10 and the lower channeled members 12, as seen in FIGURE 1.

After molding of the piece illustrated in FIGURES 1 and 2, it may be straightened to occupy or have the shape shown in FIGURES 3 and 4 whereby the carrier structure is set up and adapted to accommodate six cans or containers 14.

Referring to FIGURES 1–3, the carrier or pack structure also has a handle member which is of substantially U-shaped formation, comprising a pair of arms 48 joined to the upper channeled members 10, and a transverse handle bar 50, said arms and bar being molded in flat shape as shown in FIGURE 2, substantially in the same plane as the channeled members 10, 12. Referring to FIGURE 5, the handle 48, 50 is arranged to lie flat against one side of the top portion of the assembled pack when the same is not in use. Accordingly, the handle requires no appreciable additional space, and this is an important feature of the invention. When the pack is to be carried, the handle 48, 50 is grasped and will bend to the position shown in FIGURE 3, wherein it extends upward from the containers 14 for carrying purposes.

It will be seen from an inspection of FIGURES 3 and 4 that the tie means comprising the strips 30, 32, 34 and 36 extend between and connect portions of the channeled members 10, 12 which are spaced from the support means comprising the ring-shaped shoulders 16, 22 and the arcuate shoulders 18, 24. The strips 30, 32, 34 and 36 together with the tie strips 40, 42 and 44 are in the form of an open rectangular framework as seen in FIGURE 4. Because of the one-piece molded construction, the channelled members 10, 12, tie means 30–36, strips 40–44 and handle 48, 50 are all integral with each other and constitute a single molded piece of resilient plastic material.

Referring to FIGURE 5 is will be seen that portions of the support means on the upper and lower channeled members 10, 12 are adapted to engage a single container, as for example, either of the centrally disposed containers at one side or the other of the pack. The channel-defining means comprising the circular shoulders 16 and 22 and curved shoulders 18 and 24 are so arranged that the chimes or flanges 54 of the containers 14 are received in and are interlockingly engaged by the respective channels. In order to remove a container from the pack, it is merely necessary for the consumer to lift one corner of an upper channeled member 10, whereby the can is easily freed for removal.

Another embodiment of the invention is illustrated in FIGURES 8 and 9. This embodiment is similar in most respects to that of FIGURES 1–7, but additionally provides spacer devices which are engageable with certain of the containers at the ends thereof, to effect a spacing of the packs when these are stacked one above the other. Portions and components which are similar to those already described above have been given similar characters but with the suffix a. As shown, containers 14a are held assembled in a pack by upper and lower channeled members, only the members 10a being visible in FIGURE 8, but FIGURE 9 shows a bottom channeled member 12a of a second pack which has been placed on top of the pack shown in FIGURE 8.

The embodiment of FIGURES 8 and 9 has arms 60 provided with enlargements 62 in the shape of solid balls, the said enlargements being adapted to engage the juxtaposed top and bottom end portions of containers 14a of two packs supported one on the other. The balls 62 thus effect a spacing of the containers of the stacked packs, and provide added stability and a more precise alignment whereby a large number of packs may be stacked vertically without leaning appreciably and rendering the pile-up unstable to the extent where it might be likely to fall. The arms 60 are shown in the form of this flat webs; supplementing the spacing effected by the balls 62 is the handle portion 48a, 50a which effects a spacing of the containers disposed at the other side of the pack. Accordingly, a stable support in at least four widely spaced locations is had, of the four corner containers of the pack, whereby a number of packs may be readily stacked vertically without danger of falling.

An improved and preferred embodiment of the container carrier of the present invention is illustrated in FIGURES 10 through 12. In that embodiment, the container carrier C comprises a pair of upper channeled elements 80 and a pair of lower channeled elements 81. The channel defining formations on the upper elements 80 face oppositely to the channel-forming formations of the elements 81 to facilitate and simplify the set-up of the container carrier to receive the containers.

The upper channeled elements 80 are connected in predetermined spaced relationship by a connecting strip 82; similarly, the channeled elements 81 are connected in the same predetermined spaced relationship as the upper elements 80 by connecting strips 83. The pair of upper channeled elements 80, in turn, are connected to the pair of lower channeled elements 81 by four parallel connecting bands or strips 84. The extreme ends of all of the connecting strips 84 are provided with grooves or recesses 85 extending across one side thereof to provide hinges.

The channeled elements 80 and 81 are each three-dimensional squares comprising a centrally located circular gripping ring 86 and a pair of parallel spaced-apart curved inner and outer formations 87 and 88, respectively, at each corner of the respective element defining between them a channel 89. The outer curved formation 88 has a sloping surface 90 which provides an incline from the extreme corner of the respective channeled elements so that as the chimes of the containers are pushed toward their respective channels 89 they will force apart the upper and lower channeled elements 80 and 81 until the chimes enter the channels at which time the inherent resiliency of the channeled elements and the connecting strips 84 will cause the channeled elements to snap together to lock the container in place.

The lower channeled elements 81 have laterally projecting arms 91 extending from opposite edges thereof, namely, the edges closest and most remote to the channeled elements 80. These arms 91 are in the form of flat discs and engage and lend support to the chimes of side-by-side containers at approximately their lines of tangency. Gripping rings 86 having inner walls accessible from the sides opposite the sides on which the channels are formed are provided at the centers of the circular formations 86 and, as will be explained, facilitate machine handling and orientation of the lower channeled elements 81.

Figure 16:
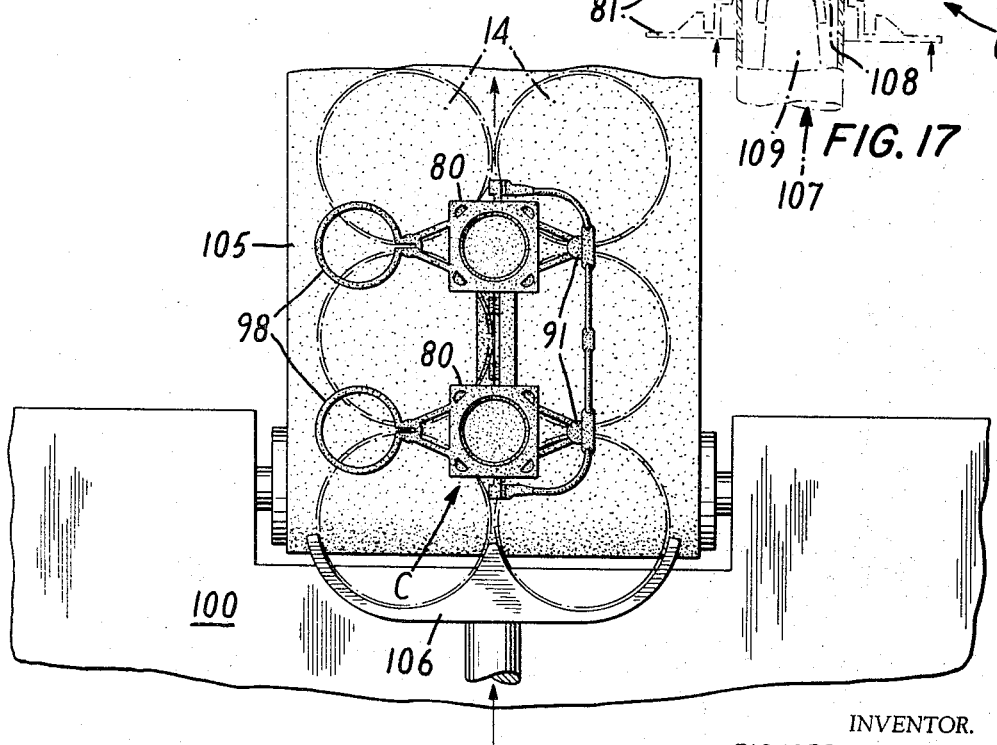
FIGURE 16 is a view showing the cluster of containers packaged in the container carrier being discharged from the apparatus shown in FIGURE 13.

The upper channeled elements 80 have a handle 93 connected thereto and lying in a plane with the connecting strips 84, the bases of the channeled elements and the arms 91. The ends of the handles are provided with grooves or recesses 94, similar to the grooves or recesses 85, to form pivotal hinges. The handle 93 is also provided with flattened portions 95 which engage and help support the chimes of side-by-side containers at approximately their lines of tangency (see FIGURE 16). The handle 93 is, in use, raised to approximately right angles from its container-engaging position shown in FIGURES 10, 11, 14, 15 and 16 when it is grasped by the consumer.

The edges of the channeled elements 80 in proximity to the channeled elements 81 have arms 96 formed integrally therewith and lying in the plane of the handle and the arms 91. These arms 96 are in the form of flat discs which serve the same purpose as the arms 91.

In the particular form of the container carrier shown in FIGURES 10–12, the container carrier provides two bottle closure premiums. Toward this end, the upper channeled elements 80 have walls 97 at the lower ends (as viewed in FIGURE 11) of the circular formations 86, providing recesses in the upper surfaces of the channeled elements. Moreover, flat discs or rings 98 are formed integrally with the arm portions 96. When each of the channeled elements 80 is detached or broken away from the handle 93 and the connecting strips 82 and 84, the ring 98 of each channeled element 80 can be placed on the neck of a bottle and the recessed side of the channeled element can be snapped on the bottle to provide a closure to replace a bottle cap removed from the bottle.

Turning now to the method and apparatus for setting up the container carrier and packaging a cluster of containers therein, the apparatus shown in FIGURE 13 includes a flat surface 100, a pair of conveyors 101 each feeding a line of containers to the surface 100 at a loading or packaging station, relatively low walls 102 guiding the containers toward stops 103 to present a group of three containers in a waiting position on opposite sides of a container carrier, a pair of pushers 104 for pushing a group of three containers toward opposite sides of a set up container carrier to lock the containers in the container carrier, a discharge conveyor 105, and a pusher 106 for pushing a 6-pack cluster of containers from the loading station onto the discharge conveyor 105. The pushers 104 each carry an extended wall 104a which serves as a gate to stop the feed of containers and maintain them in slipping engagement with the constantly moving conveyors 101 until the pushers 104 are returned to their initial positions shown in FIGURE 13.

Figure 17:
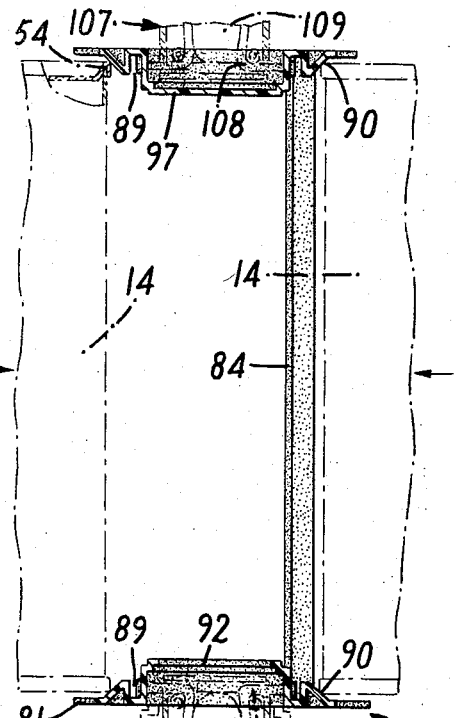
FIGURE 17 is a cross-sectional elevation of the container carrier set up to receive the chimed containers.

The container carrier C can be fed one at a time or several at a time to the loading station from a stack, from a rotating magazine or from a continuous roll from which they can be detached. The circular gripping rings 86 of the upper channeled elements 80 can be engaged and gripped from above and the gripping rings 86 of the lower channeled elements 81 can be engaged and gripped from below by gripping elements generally designated 107. These gripping elements 107, as best shown in FIGURES 17 and 18, include a plurality of articulated fingers 108 surrounding a centrally located movable wedge 109. The actuation of the wedge 109 expands the articulated fingers 108 into gripping engagement with the gripping rings 86 of the upper and lower channeled elements 80 and 81.

In setting up the container carrier, the lower channeled elements 81 are positioned by the respective gripping elements 107 in a position between the pushers 104, and the upper gripping elements grip and swing the upper channeled elements from the side-by-side positions shown in FIGURE 10 to the overhead position shown in FIGURES 17 and 18. The upper channeled elements 80 are maintained in parallel relationship with the lower elements 81 while they are swung through a 90° arc from the side-by-side to the overhead positions, and the connecting bands or strips 84 are pivoted at the hinges 85 to upstanding positions at right angles to the channeled elements 80 and 81. It should be noted that making the container carrier with the upper and lower channeled elements 80 and 81 facing in opposite directions, as shown in FIGURE 10, in contrast to the embodiment shown in FIGURE 1 where they face in the same direction, the gripping elements 107 can grip the upper channeled elements from above and need not be oriented in traveling through the 90° arc. In the embodiment shown in FIGURE 1, the upper gripping elements would have to grip the upper channeled elements from below and then be oriented 180° while traveling through the 90° arc. Therefore, inverting the upper channel elements relative to the lower channeled elements appreciably simplifies the packaging apparatus.

When the container carrier has been set up as shown in FIGURE 17, the pushers 104 are actuated to slide three containers toward the container carrier from opposite directions. As shown in FIGURE 17, the chimes 54 of the containers engage and slide along the sloped ramp surfaces 90 at the corners of the channeled elements 80 and 81, stretching or forcing the resilient material of the channeled elements apart until the chimes enter the channels 89, whereupon the channeled elements snap together locking the containers in a six-pack cluster in nested relationship. The pusher 106 then slides the six-pack onto the conveyor 105 to discharge and clear the loading station for the next operation. As soon as the pushers 104 are restored to their initial positions, additional containers are advanced to the waiting positions by the conveyors 101.

It is understood that any number of containers can be assembled in one or more container carriers simultaneously. For example, the container carriers can be molded in relatively long strips or fed from a continuous roll to the assembling station and the strips subdivided either before or after the containers are locked therein into separate packages carrying any number of containers. The long continuous strips or web of container carriers is made by molding continuous strings of the lower channeled elements and continuous strings of the upper channeled elements. Packages for the desired number of containers can be made by severing the connections between particular lower channeled elements and the connections between corresponding upper channeled elements.

Still another embodiment of the container carrier C of the present invention for packing two, three, four or more containers in-line is illustrated in FIGURES 19 through 21. This container carrier includes upper and lower channeled elements 112 and 113, respectively, a connecting strip 114 connecting the upper channeled elements 112, a connecting strip 115 connecting the lower channeled elements 113, and a plurality of connecting strips 116 connecting the upper and lower channeled elements and having hinge connections at both ends. The structure is generally similar to the part of the container carrier shown in FIGURES 10 through 12 which serves to hold the two middle containers and with the excess portions deleted.

The channeled elements each include a pair of channel forming means, each channel being defined by spaced-apart inner and outer curved formations 117 and 118, respectively. An inclined ramp surface 119 is provided at each container-engaging corner of each channeled element to facilitate the insertion of the containers between the upper and lower channeled elements.

If a series of three, four or more containers is locked together in an in-line relationship by the container carrier shown in FIGURES 19–21, slippage of the container chimes relative to the channels which tends to move the containers out of the in-line relationship can be prevented or minimized by the serrations 120 (see FIGURE 20) in the walls defining the channels. Also, a protuberance or knob 121 is formed integrally with the inner wall formation 117 to engage an upper outer edge of the chime and thereby lock the chime on the respective channel.

Shown in FIGURE 22 is another form of channeled element, which may be employed either as an upper or lower channeled element in, for example, the container carrier embodiment depicted in FIGURES 10 through 12. Here a single channeled element 130 in the form of a three-dimensional square comprises a centrally located circular gripping ring 131, having an upstanding exterior cylindrical wall 132, and a pair of wall formations 133 and 134 disposed at each corner of the element 130, defining between the formations 133 and 134 and the cylindrical wall 132, a chime-receiving channel 135. Integrally formed with the element are the necessary connecting strips 137 and 138 which function in an identical manner to the strips 83 and 84 in the embodiment shown in FIGURES 10 through 12. Furthermore, the element 130 is shown to have a pair of outwardly projecting arms 140 extending from opposite edges of the element 130. As with the aforementioned embodiment of FIGURES 10 through 12, the arms 140 engage and support the chimes of side-by-side containers at approximately their point of tangency.

The chime-receiving channels 135 are disposed adjacent each corner of the element 130. The formations 133 and 134, disposed at each corner of the element 130, are each identical in construction and positioned along adjacent edges of the element 130. Each of the formations has a top surface 142 which includes a horizontal portion 142a and a sloping portion 142b which provides an incline from the horizontal portion 142a to the corner of the element 130. The sloped edges 142b of each formation 133 and 134 are so arranged that they cooperate to define a sloped ramp which will engage a chime of a can or container which is being pushed towards the chime-receiving cavity 135, and as they are engaged move away from the chimes permitting them to enter the channel 135, at which time the inherent resiliency of the channeled element and the connecting strips will lock the container in place in the channel 135 between upper and lower of the elements 130.

The invention has been shown in preferred forms and by way of example only, and various modifications and variations may be made therein without departing from the spirit of the invention. The invention, therefore, is not to be limited to any particular form or embodiment except insofar as such limitations are expressly set forth in the appended claims.

I claim:

1. A molded three-dimensional plastic container carrier for carrying in nested interlocking relationship a plurality of containers having cylindrical chimes at both ends comprising upper and lower channeled elements, each channeled element including inner upstanding chime engaging means integrally formed with the respective channeled element adjacent the inner side of the chime of a container and outer upstanding chime engaging means integrally formed with the respective channeled element adjacent the outer side of the chime of a container, means integrally formed with and connecting said channeled elements, and means formed on at least one of said upstanding chime engaging means to impede relative movement between the chime and the respective channeled element.

2. A container carrier as set forth in claim 1 in which said relative movement impeding means includes a series of serrations engaging an arc of the chime to increase the frictional engagement between the channel and the chime of the container to prevent relative movement of the chime within the respective channel.

3. A container carrier as set forth in claim 1 in which said relative movement impeding means includes a projection integrally formed with one of the upstanding chime engaging means above the base of the channel to engage and interlock with the chimed portion of the container to prevent accidental removal of the chime from the respective channel.

4. In a molded three dimensional plastic container for carrying in nested interlocking relationship a plurality of containers having cylindrical chimes at both ends comprising upper and lower channeled elements, each channeled element including inner upstanding chime engaging means integrally formed with the respective channeled element adjacent the inner side of the chime of the container and outer upstanding chime engaging means integrally formed with the respective channeled element adjacent the outer side of the chime of the container and means integrally formed with and connecting the channeled elements, at least one of the channeled elements being characterized by an upstanding annular bottle cap formed at the center and defined by an annular wall and a cover wall, the outside of the annular wall forming at least part of one of the inner chime engaging means and the inside thereof a wall for engaging and interlocking with the open end of a bottle, whereby the channeled element can be detached from the carrier and used as a bottle cap after the carrier has served its purpose.

5. A bottle engaging channeled element as set forth in claim 4 including a loop lying in the same plane as said channeled element for engaging the neck of a bottle and a bendable connection between the flexible loop and the channeled element and lying in the same plane as the loop and channeled element.

References Cited
UNITED STATES PATENTS

| | | | |
|---|---|---|---|
| 3,000,527 | 9/1961 | Jennings et al. | 220—94 X |
| 3,003,805 | 10/1961 | Glazer | 220—102 |
| 3,134,485 | 5/1964 | Bonkowski et al. | 206—65 |
| 3,203,580 | 8/1965 | Erickson | 220—102 |

DAVID M. BOCKENEK, *Primary Examiner.*